United States Patent
Ishio

(10) Patent No.: US 12,084,138 B2
(45) Date of Patent: Sep. 10, 2024

(54) STEERING COUNTERFORCE DEVICE OF STEER-BY-WIRE

(71) Applicant: HONDA MOTOR CO., LTD., Tokyo (JP)

(72) Inventor: Jun Ishio, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 17/810,346

(22) Filed: Jul. 1, 2022

(65) Prior Publication Data
US 2023/0010325 A1    Jan. 12, 2023

(30) Foreign Application Priority Data

Jul. 6, 2021  (CN) .......................... 202110769965.7

(51) Int. Cl.
  *B62D 6/00*       (2006.01)
(52) U.S. Cl.
  CPC .................................. *B62D 6/008* (2013.01)

(58) Field of Classification Search
CPC ......... B62D 6/008; B62D 5/006; B62D 5/046
USPC ....................................................... 701/41–44
See application file for complete search history.

(56) References Cited

FOREIGN PATENT DOCUMENTS

JP            4908049 B2      4/2012

*Primary Examiner* — Hai H Huynh
(74) *Attorney, Agent, or Firm* — CKC & Partners Co., LLC

(57) ABSTRACT

A steering counterforce device of steer-by-wire includes a shaft force estimator which estimates a shaft force of a steering actuator based on an electrical current value of the steering actuator causing steered wheels to steer, and a model steering force setter which sets a model steering force based on the shaft force estimated by the shaft force estimator. This steering counterforce device of steer-by-wire controls electrical current supplied to a steering counterforce actuator which grants counterforce torque to an operator, so that steering torque of the operator of steer-by-wire becomes a model steering force set by the model steering force setter.

6 Claims, 4 Drawing Sheets

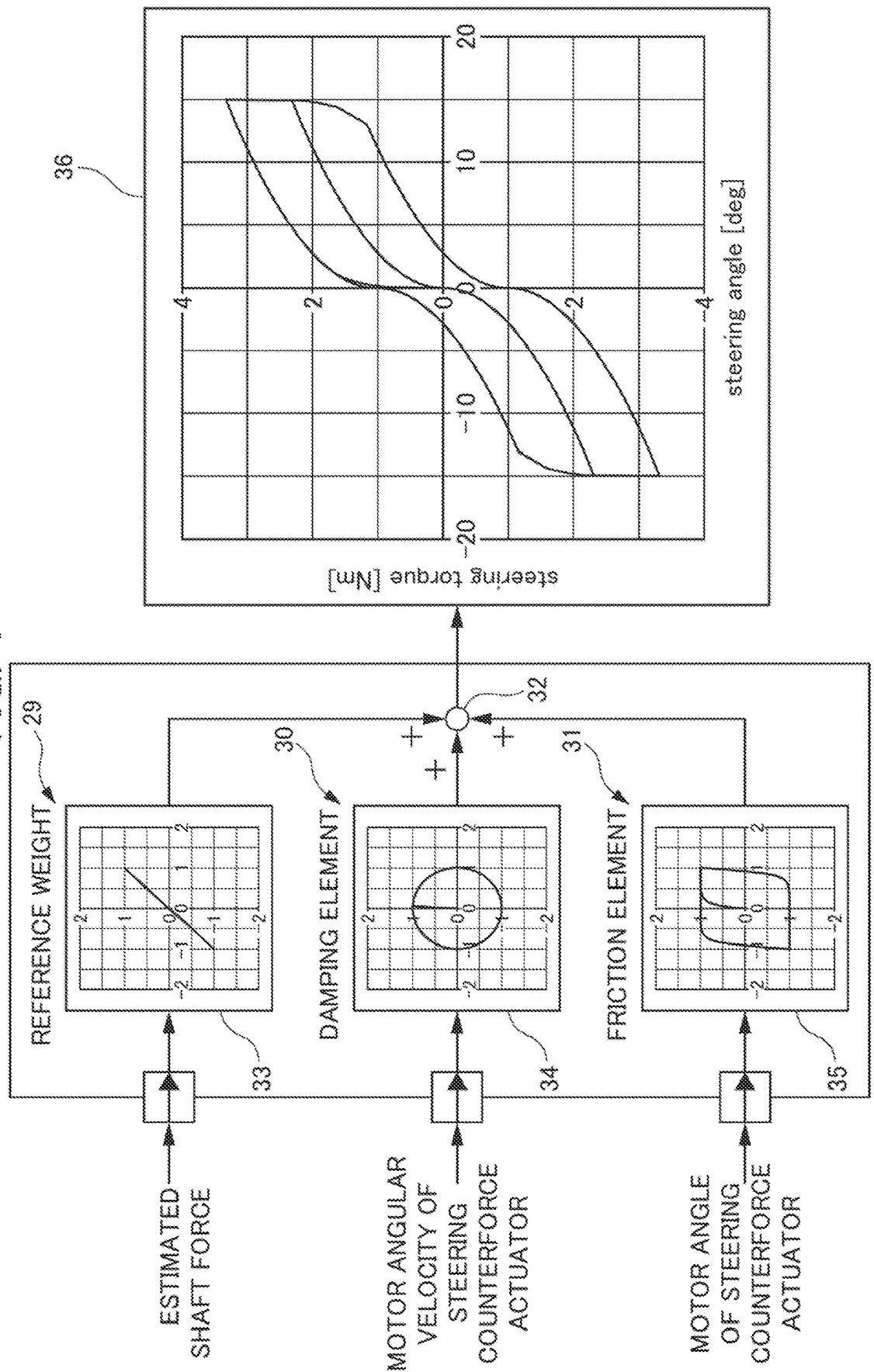

STEERING COUNTERFORCE DEVICE OF STEER-BY-WIRE

This application is based on and claims the benefit of priority from Chinese Patent Application No. CN202110769965.7, filed on 6 Jul. 2021, the content of which is incorporated herein by reference.

BACKGROUND OF THE INVENTION

Field of the Invention

The present invention relates to a steering counterforce device of steer-by-wire.

Related Art

Conventionally, a steer-by-wire-type steering device has been known in which a manipulandum (for example, steering wheel, lever, etc.) on which a driver performs manipulation and steered wheels are not mechanically connected. For example, as disclosed in Patent Document 1 listed below, steer-by-wire has been known which sets a target steering counterforce (target steering counterforce torque) based on an error signal according to error between a target steering angle and an actual steering angle, and performs feedback control on electrical current flowing to a counterforce motor, so that the actual steering torque detected based on the output value of a steering torque sensor matches the target steering counterforce torque.

Patent Document 1: Japanese Patent No. 4908049

SUMMARY OF THE INVENTION

In the conventional case, since the counterforce according to the error between the target steering angle and actual steering angle differs for every vehicle, it is necessary to establish a map, etc. of the counterforce for every vehicle. In this case, labor is required in development, and there is margin for improvement.

The present invention has an object of providing a steering counterforce device of steer-by-wire which can easily set the target steering counterforce by minimizing the influence of vehicle characteristics.

A first aspect of the present invention includes: a shaft force estimator which estimates a shaft force of a steering actuator, based on an electrical current value of the steering actuator which steers a steered wheel; and a model steering force setter which sets a model steering force based on a shaft force estimated by the shaft force estimator, in which electrical current supplied to a steering counterforce actuator granting counterforce torque to an operator is controlled so that a steering torque of the operator of steer-by-wire becomes a model steering force set by the model steering force setter.

According to a second aspect of the present invention, the shaft force estimator as described in the first aspect may estimate friction of the steering actuator based on motor speed of the steering actuator, and correct the shaft force of the steering actuator based on estimated friction.

According to a third aspect of the present invention, the shaft force estimator as described in the second aspect may correct shaft force of the steering actuator based on a viscosity correction value obtained based on the motor speed of the steering actuator.

According to the fourth aspect of the present invention, the shaft force estimator as described in the second or third aspect may correct the shaft force of the steering actuator, based on an inertia correction value obtained based on the motor speed of the steering actuator.

According to a fifth aspect of the present invention, the model steering force setter as described in the first aspect may obtain a friction correction value based on motor angle of the steering counterforce actuator, and correct a base counterforce obtained based on the shaft force estimated by the shaft force estimator, based on the friction correction value thus obtained.

According to a sixth aspect of the present invention, the model steering force setter as described in the first aspect may obtain a damping correction value based on motor angular velocity of the steering counterforce actuator, and correct a base counterforce obtained based on shaft force estimated by the shaft force estimator, based on the damping correction value thus obtained.

According to the present invention, it is possible to provide a steering counterforce device of steer-by-wire which can easily set the target steering counterforce by minimizing the influence of vehicle characteristics.

BRIEF DESCRIPTION OF THE DRAWINGS

FIG. 4 is an outline block diagram showing the configuration of a model steering force setter.

DETAILED DESCRIPTION OF THE INVENTION

Hereinafter, a specific embodiment of the present invention will be explained in detail by referencing the drawings.

Figure 1:
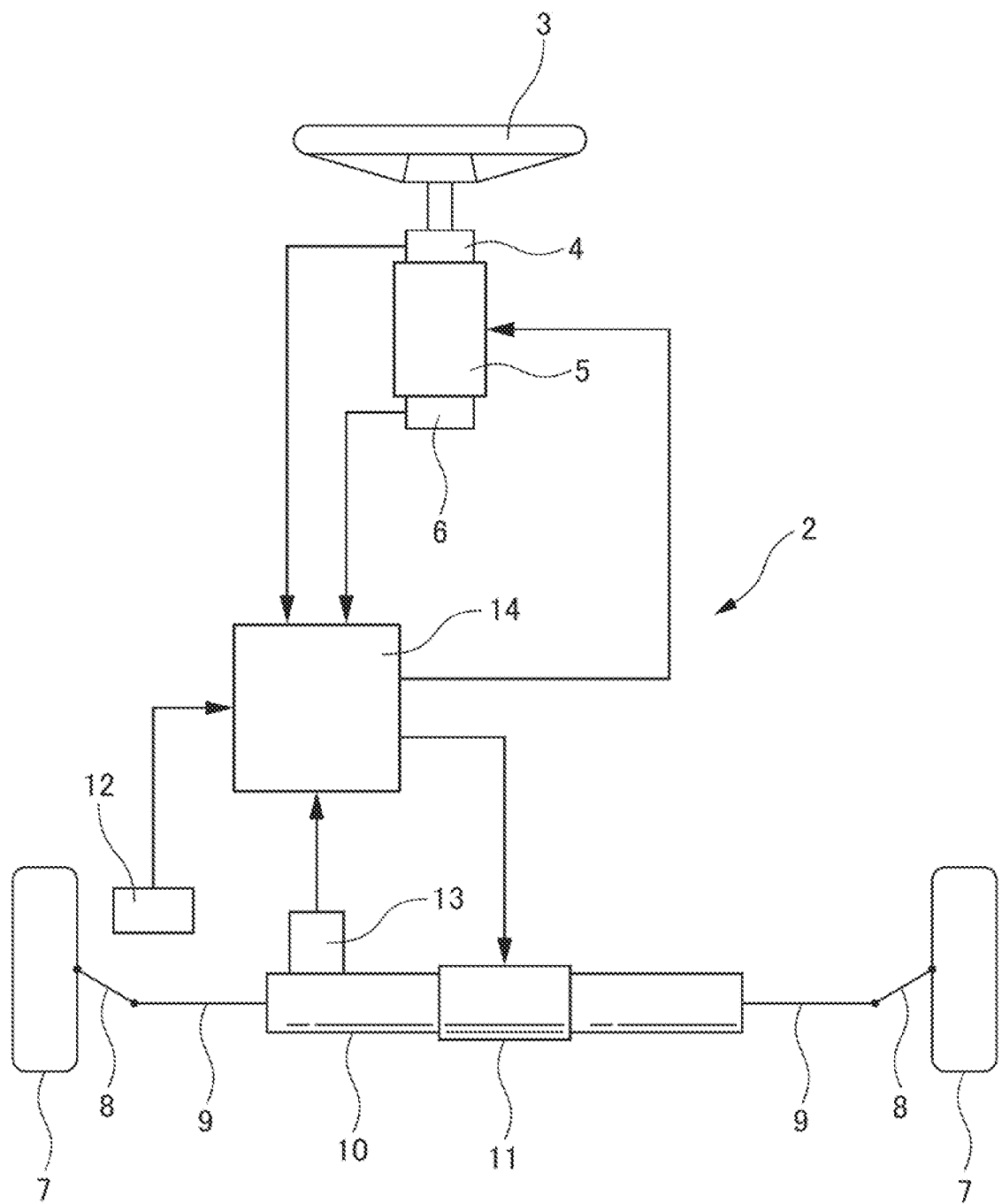
FIG. 1 is an outline configuration view showing an example of steer-by-wire to which the steering counterforce device of steer-by-wire according to an embodiment of the present invention is applied.

FIG. 1 is an outline configuration view showing an example of steer-by-wire to which a steering counterforce device of steer-by-wire according to an embodiment of the present invention is applied. As shown in this figure, steer-by-wire 2 to which a steering counterforce device 1 of steer-by-wire of the present embodiment is applied includes: a steering wheel (operator) 3 which is manipulated by a driver; a steering angle sensor 4 which detects a steering angle of the steering wheel 3; a steering counterforce actuator 5 which grants steering counterforce (counterforce torque) to the steering wheel 3; a steering torque sensor 6 which detects steering torque that acts on the steering wheel 3; a rack shaft 10 coupled via a knuckle arm 8 and tie rod 9 to left and right wheels (steered wheels) 7; a steering actuator 11 which causes the wheels 7 to steer by driving the rack shaft 10 in an axial direction; a vehicle speed sensor 12 which detects vehicle speed; a steering angle sensor 13 which detects steering angle of the wheels from an axial direction position of the rack shaft 10; and a control device (ECU) 14 which controls the steering counterforce actuator 5 and the steering actuator 11. To this steer-by-wire 2, the steering counterforce device 1 of steer-by-wire of the present invention is applied. More specifically, the ECU 14 has a steering device (not shown) controlling a steering actuator 11 based on a detection signal from the steering angle sensor 4, vehicle speed sensor 12, etc., and the steering counterforce device 1 of steer-by-wire of the present invention controlling the steering counterforce actuator 5. It should be noted that, in the present embodiment, the steering counterforce actuator 5 and steering actuator 11 are motors.

Figure 2:
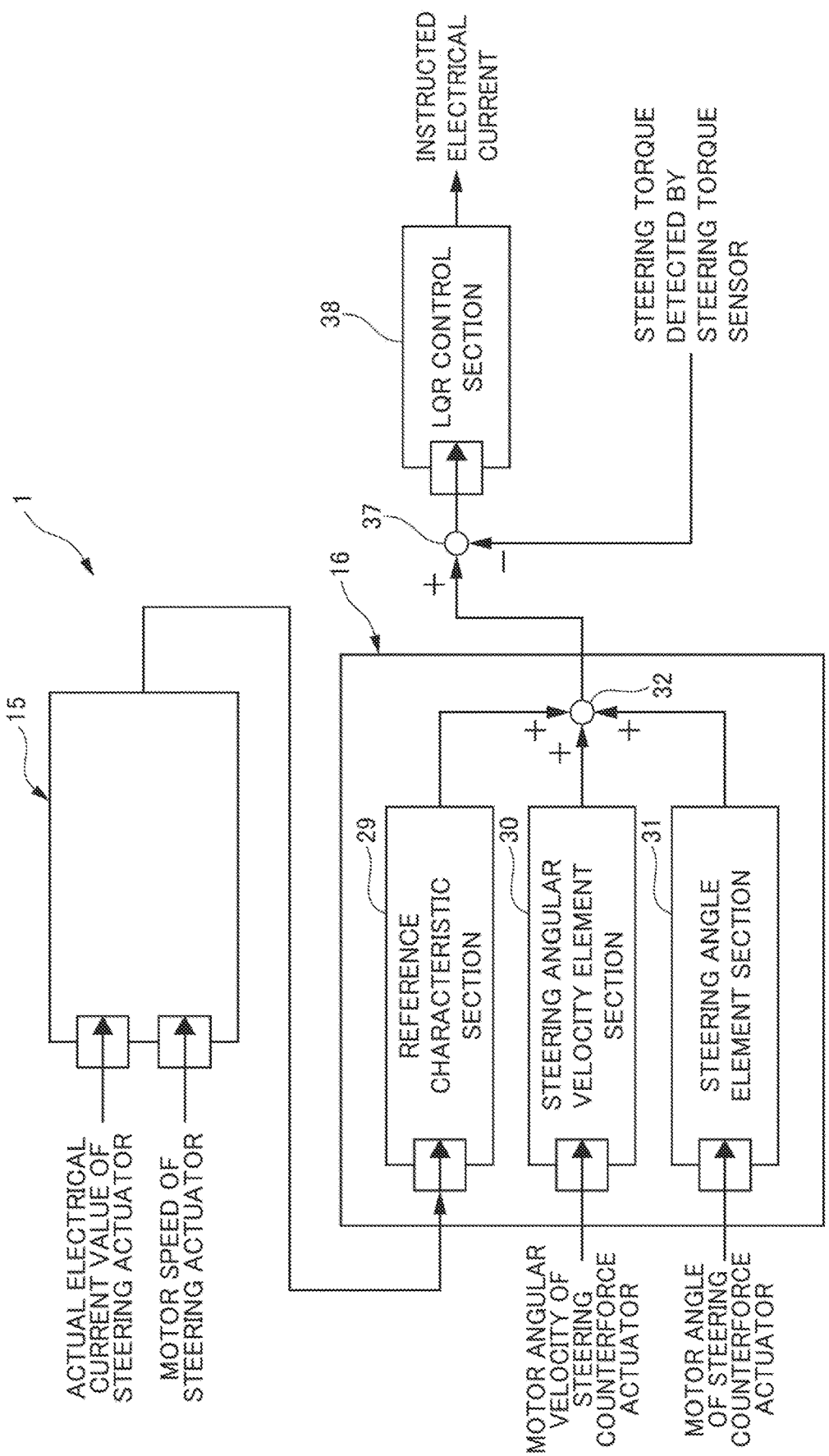
FIG. 2 is an outline block diagram showing the configuration of a steering counterforce device of steer-by-wire according to an embodiment of the present invention.

FIG. 2 is an outline block diagram showing the configuration of the steering counterforce device of steer-by-wire according to an embodiment of the present invention. The steering counterforce device 1 of steer-by-wire includes: a shaft force estimator 15 which estimates a shaft force of the steering actuator 11 based on the electrical current value of the steering actuator 11 causing the wheels 7 to steer; and a model steering force setter 16 which sets a model steering force based on the shaft force estimated by the shaft force estimator 15.

Figure 3:
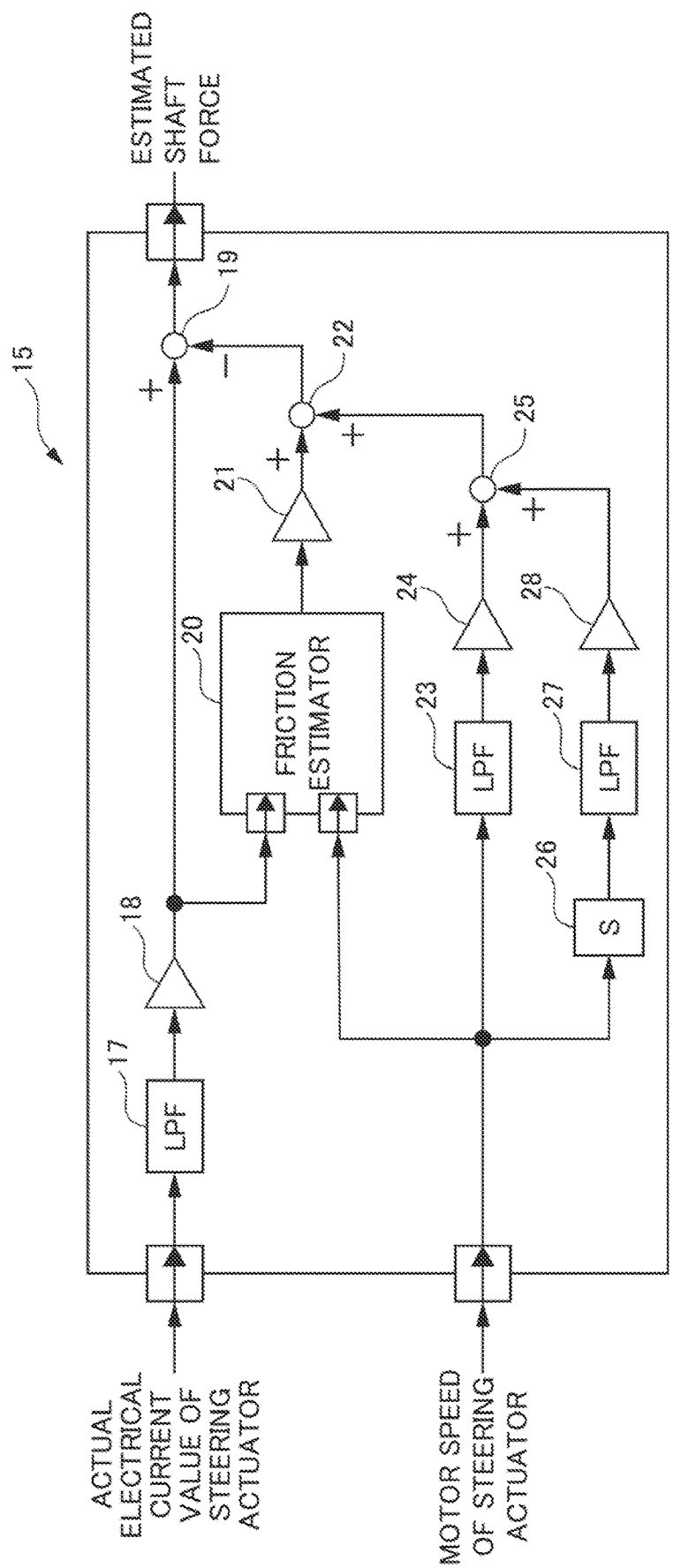
FIG. 3 is an outline block diagram showing the configuration of a shaft force estimator.

FIG. 3 is an outline block diagram showing the configuration of the shaft force estimator. The shaft force estimator 15 estimates the shaft force based on the actual electrical current value, which is the electrical current value flowing to the steering actuator 11, and the motor speed of the steering actuator 11. In other words, as shown in FIG. 3, the actual electrical current value of the steering actuator 11 and the motor speed of the steering actuator 11 are inputted to the shaft force estimator 15.

The actual electrical current value of the steering actuator 11 is inputted to a low-pass filter 17. In the low-pass filter 17, the high-frequency component is removed. The actual electrical current value from which the high-frequency component was removed by the low-pass filter 17 is inputted to a converter 18. In the converter 18, shaft force according to the inputted actual electrical current value is generated. The shaft force generated in the converter 18 is inputted to a subtracter 19.

In addition, the shaft force generated in the converter 18 is inputted to a friction estimator 20. To this friction estimator 20, the motor speed of the steering actuator 11 is inputted in addition to the shaft force generated in the converter 18. The friction estimator 20 estimates the friction of the steering actuator 11, based on the shaft force generated in the converter 18 and the motor speed of the steering actuator 11. The friction estimated in the friction estimator 20 is inputted to a friction correction unit 21. In the friction correction unit 21, a friction correction value is calculated by multiplying a friction correction gain by the friction estimated in the friction estimator 20. The friction correction value obtained in the friction correction unit 21 is inputted to an adder 22.

On the other hand, the motor speed of the steering actuator 11 is inputted not only to the aforementioned friction estimator 20, but also a low-pass filter 23. In the low-pass filter 23, the high-frequency component is removed. The motor speed from which the high-frequency component was removed by the low-pass filter 23 is inputted to a viscosity correction unit 24. In the viscosity correction unit 24, a viscosity correction value is calculated by multiplying a viscosity correction gain by the motor speed from which the high-frequency component was removed by the low-pass filter 23. The viscosity correction value obtained by the viscosity correction unit 24 is inputted to the adder 25.

The motor speed of the steering actuator 11 is inputted not only to the aforementioned friction estimator 20 and low-pass filter 23, but also a differentiator 26. In the differentiator 26, motor acceleration is calculated by differentiating the motor speed of the steering actuator 11. The motor acceleration calculated by the differentiator 26 is inputted to the low-pass filter 27. In the low-pass filter 27, the high-frequency component is removed. Motor acceleration from which the high-frequency component was removed by the low-pass filter 27 is inputted to the inertia correction unit 28. In the inertia correction unit 28, an inertia correction value is calculated by multiplying the inertia correction gain by the motor acceleration from which the high-frequency component was removed by the low-pass filter 27. The inertia correction value obtained by the inertia correction unit 28 is inputted to the adder 25.

The viscosity correction value from the viscosity correction unit 24 and the inertia correction value from the inertia correction unit 28 as mentioned above are inputted to the adder 25. In the adder 25, the viscosity correction value and inertia correction value are added, whereby a first adding value is generated. The first adding value from the adder 25 is inputted to the adder 22. The friction correction value from the friction correction unit 21 is inputted as mentioned above to the adder 22. In the adder 22, the first adding value and friction correction value are added, whereby a second adding value is generated. The second adding value from the adder 22 is inputted to the subtracter 19. The shaft force generated in the converter 18 is inputted as mentioned above to the subtracter 19. The second adding value is subtracted from the shaft force generated in the converter 18 by the subtracter 19, whereby an estimated shaft force of the steering actuator 11 is generated. By configuring in this way, the shaft force of the steering actuator 11 is estimated by the shaft force estimator 15.

With the shaft force estimator 15, the second adding value containing friction estimated by the friction estimation unit 20 is subtracted from the shaft force generated in the converter 18. Therefore, the shaft force estimator 15 can estimate the friction of the steering actuator 11 based on the motor speed of the steering actuator 11, and correct the shaft force of the steering actuator 11 based on the estimated friction. In addition, with the shaft force estimator 15, the second adding value containing the viscosity correction value is subtracted from the shaft force generated by the converter 18. Therefore, the shaft force estimator 15 can correct the shaft force of the steering actuator 11, based on the viscosity correction value obtained based on the motor speed of the steering actuator 11. Furthermore, with the shaft force estimator 15, the second adding value containing the inertia correction value is subtracted from the shaft force generated by the converter 18. Therefore, the shaft force estimator 15 can correct the shaft force of the steering actuator 11, based on the inertia correction value obtained based on the motor speed of the steering actuator 11.

FIG. 4 is an outline block diagram showing the configuration of a model steering force setter. The model steering force setter 16 sets a model steering force based on the shaft force estimated by the shaft force estimator 15, motor angular velocity of the steering counterforce actuator 5, and motor angle of the steering counterforce actuator 5. In other words, as shown in FIGS. 2 and 4, the shaft force estimated in the shaft force estimator 15, motor angular velocity of the steering counterforce actuator 5 and motor angle of the steering counterforce actuator 5 are inputted to the model steering force setter 16. In the present embodiment, the model steering force setter 16 has a reference characteristic section 29, steering angular velocity element section 30, steering angle element section 31 and adder 32.

The estimated shaft force estimated in the shaft force estimator 15 is inputted to the reference characteristic section 29. The reference characteristic section 29 generates reference weight corresponding to the inputted estimated shaft force, by referencing a map 33, in which the horizontal axis is the estimated shaft force, and the vertical axis is the reference weight. The reference weight generated in the reference characteristic section 29 is inputted to the adder 32.

The motor angular velocity of the steering counterforce actuator 5 is inputted to the steering angular velocity element section 30. The steering angular velocity element section 30 has a map 34 in which the horizontal axis is the motor angular velocity, and the vertical axis is a damping correction value. The steering angular velocity element section 30 converts the inputted motor angular velocity to the damping correction value. The damping correction value from the steering angular velocity element section 30 is inputted to the adder 32.

The motor angle of the steering counterforce actuator 5 is inputted to the steering angle element section 31. The steering angle element section 31 has a map 35 in which the horizontal axis is motor angle, and the vertical axis is friction correction value. The steering angle element section 31 converts the inputted motor angle into friction correction value. The friction correction value from the steering angle element section 31 is inputted to the adder 32.

In the adder 32, the reference weight, the damping correction value and friction correction value are added. The adding results of the adder 32 become the model steering force characteristic 36. By configuring in this way, the model steering force setter 16 generates the reference weight, damping correction value and friction correction value respectively in the reference characteristic section 29, steering angular velocity element section 30 and steering angle element section 31, and sets the model steering force, by adding the generated reference weight, damping correction value and friction correction value.

In the model steering force setter 16, the damping correction value is added to the reference weight. Therefore, the model steering force setter 16 obtains the damping correction value based on the motor angular velocity of the steering counterforce actuator 5, and can correct a base counterforce obtained based on the shaft force estimated in the shaft force estimator 15, based on the obtained damping correction value. In addition, in the model steering force setter 16, the friction correction value is added to the reference weight. Therefore, the model steering force setter 16 obtains the friction correction value based on the motor angle of the steering counterforce actuator 5, and can correct the base counterforce obtained based on the shaft force estimated in the shaft force estimator 15, based on the obtained friction correction value.

As shown in FIG. 2, the model steering force from the model steering force setter 16 is inputted to the subtracter 37. The steering torque detected by the steering torque sensor 6 is inputted to this subtracter 37. The steering torque detected by the steering torque sensor 6 is subtracted in the subtracter 37 from the model steering force (model steering torque) set by the model steering force setter 16. The subtraction results of the subtracter 37 are inputted to an LQR control section 38. The LQR control section 38 performs LQR control on the subtraction results of the subtracter 37, whereby an instructed electrical current value, which is the electrical current value to flow to the steering counterforce actuator 5, is generated. Then, the steering counterforce device 1 of steer-by-wire feedback controls so that the electrical current value inputted to the steering counterforce actuator 5 becomes the instructed electrical current value. By configuring in this way, the steering counterforce device 1 of steer-by-wire controls the electrical current supplied to the steering counterforce actuator 5 granting the counterforce torque to the steering wheel 3, so that the steering torque of the steering wheel 3 of the steer-by-wire 2 becomes the model steering force set by the model steering force setter 16.

In the case of the steering counterforce device 1 of steer-by-wire of the present embodiment, the electrical current flowing to the steering counterforce actuator 5 is feedback controlled as mentioned above. Therefore, since the output of the steering actuator 11 and the counterforce received by the wheel 7 from the road are in a substantially equal relationship, it is possible to easily set the target steering counterforce with the influence of the vehicle characteristics at a minimum, by setting the target steering counterforce of the steering counterforce actuator 5, based on the model steering force from the electrical current value of the steering actuator 11. In addition, in the case of the steering counterforce device 1 of steer-by-wire of the present embodiment, the shaft force of the steering actuator 11 is corrected by the friction estimated from the motor speed of the steering actuator 11. Therefore, the deviation from the actual rack shaft force occurring from friction during turn in or quick turn of the steering wheel 3 can be corrected.

In addition, in the case of the steering counterforce device 1 of steer-by-wire of the present embodiment, the shaft force of the steering actuator 11 is corrected by the viscosity correction value and inertia correction value obtained from the motor speed of the steering actuator 11. Therefore, by performing the correction of the viscosity correction (turn in) and inertia correction (quick turn) from the motor speed, it is possible to further suppress the aforementioned deviation. In addition, in the case of the steering counterforce device 1 of steer-by-wire of the present embodiment, the base counterforce obtained from the shaft force estimated by the shaft force estimator 15 is corrected by the friction correction value obtained from the steering wheel angle, which is the motor angle of the steering counterforce actuator 5. Therefore, by correcting the reference weight based on the estimated shaft force by the steering wheel angle, it is possible to set the appropriate steering force for the driver of the vehicle. Furthermore, in the case of the steering counterforce device 1 of steer-by-wire of the present embodiment, the base counterforce obtained from the shaft force estimated by the shaft force estimator 15 is corrected by the damping correction value obtained from the steering wheel angular velocity, which is the motor angular velocity of the steering counterforce actuator 5. Therefore, by correcting the reference weight based on the estimated shaft force by the steering wheel angular velocity, it is possible to set the target steering counterforce according to not only the steering wheel angle, but also the steering wheel angular velocity, and thus possible to set a further appropriate steering force for the driver.

It should be noted that the present invention is not limited to the above-mentioned embodiment, and that modifications and improvements within a scope capable of achieving the object of the present invention are encompassed by the present invention.

For example, in the above-mentioned embodiment, the shaft force was corrected by the viscosity correction value and inertia correction value; however, the shaft force may be corrected by the viscosity correction value or inertia correction value.

EXPLANATION OF REFERENCE NUMERALS

1: steering counterforce device of steer-by-wire
2: steer-by-wire
3: steering wheel (operator)

5: steering counterforce actuator
7: wheel (steered wheel)
11: steering actuator
15: shaft force estimator
16: model steering force setter

What is claimed is:

1. A steering counterforce device of steer-by-wire, comprising:
   a shaft force estimator which estimates a shaft force of a steering actuator, based on an electrical current value of the steering actuator which steers a steered wheel; and
   a model steering force setter which sets a model steering force based on a shaft force estimated by the shaft force estimator,
   wherein electrical current supplied to a steering counterforce actuator granting counterforce torque to an operator is controlled so that a steering torque of the operator of steer-by-wire becomes a model steering force set by the model steering force setter.

2. A steering counterforce device of steer-by-wire according to claim 1, wherein the shaft force estimator estimates friction of the steering actuator based on motor speed of the steering actuator, and corrects the shaft force of the steering actuator based on estimated friction.

3. A steering counterforce device of steer-by-wire according to claim 2, wherein the shaft force estimator corrects shaft force of the steering actuator based on a viscosity correction value obtained based on the motor speed of the steering actuator.

4. A steering counterforce device of steer-by-wire according to claim 2, wherein the shaft force estimator corrects the shaft force of the steering actuator, based on an inertia correction value obtained based on the motor speed of the steering actuator.

5. A steering counterforce device of steer-by-wire according to claim 1, wherein the model steering force setter obtains a friction correction value based on motor angle of the steering counterforce actuator, and corrects a base counterforce obtained based on the shaft force estimated by the shaft force estimator, based on the friction correction value thus obtained.

6. A steering counterforce device of steer-by-wire according to claim 1, wherein the model steering force setter obtains a damping correction value based on motor angular velocity of the steering counterforce actuator, and corrects a base counterforce obtained based on shaft force estimated by the shaft force estimator, based on the damping correction value thus obtained.

* * * * *